F. EICHE.
CLOTHES LINE REEL.
APPLICATION FILED FEB. 26, 1910.
973,266.
Patented Oct. 18, 1910.
2 SHEETS—SHEET 1.
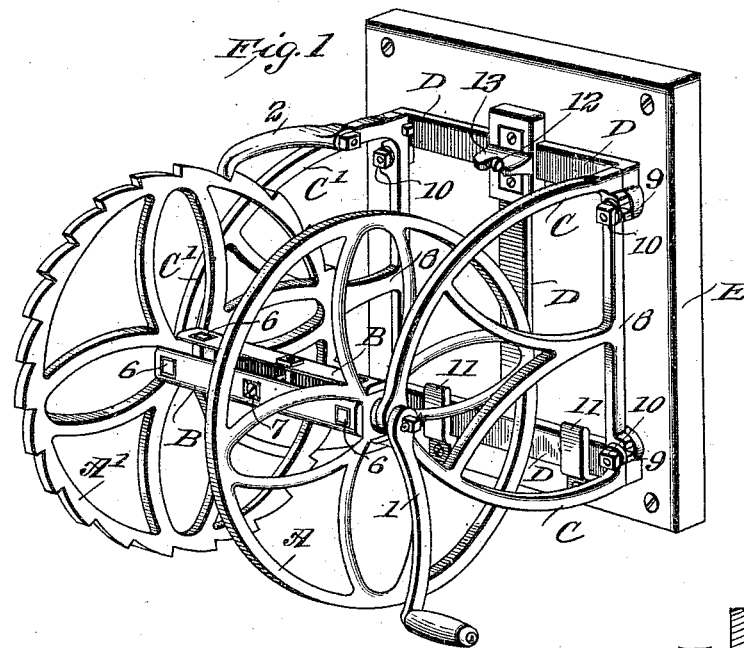
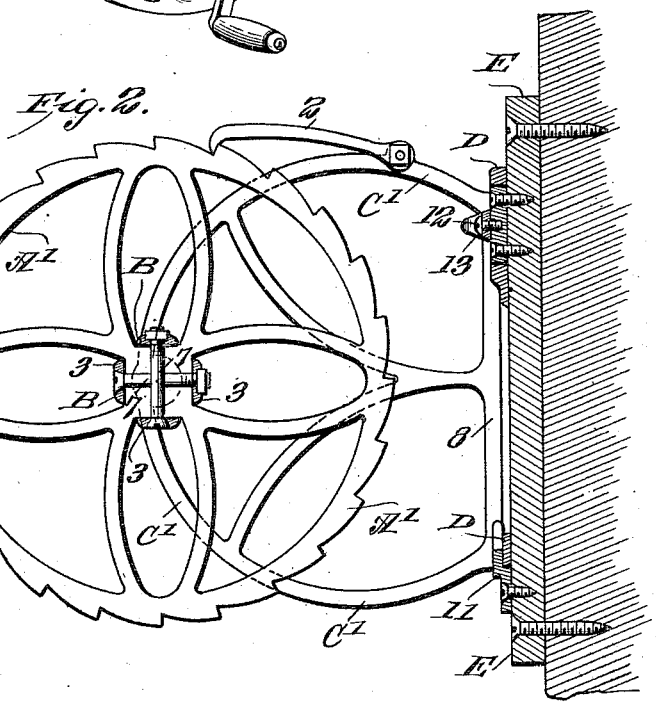
WITNESSES:
INVENTOR
FREDERICK EICHE
BY
ATTORNEYS F. EICHE.
CLOTHES LINE REEL.
APPLICATION FILED FEB. 26, 1910.
973,266.
Patented Oct. 18, 1910.
2 SHEETS—SHEET 2.
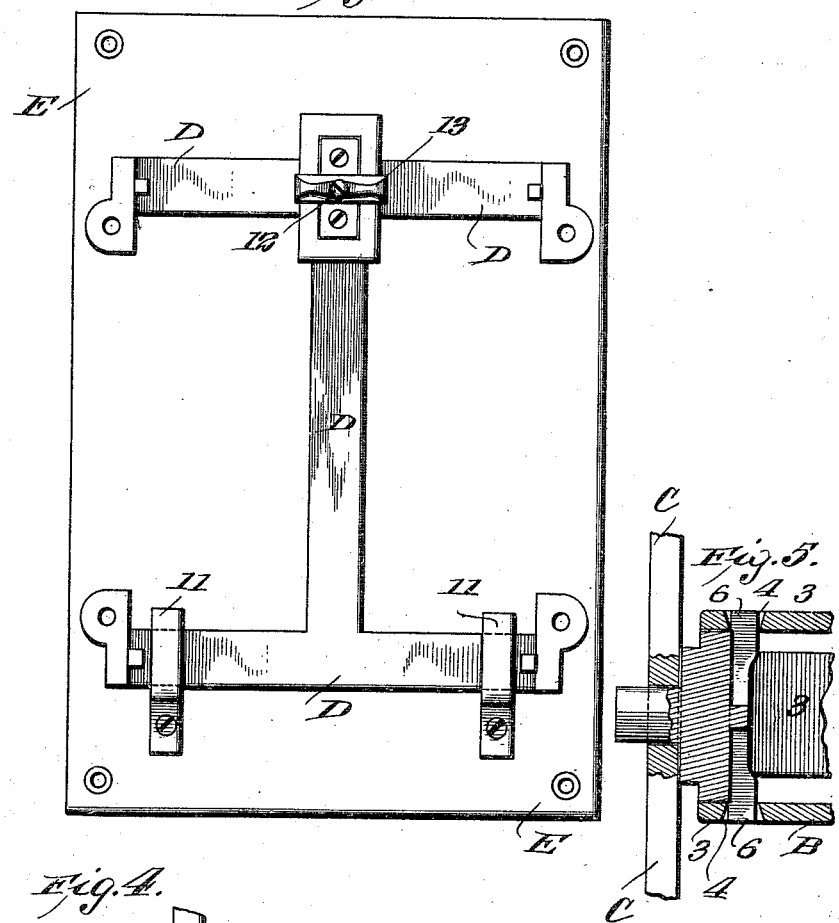
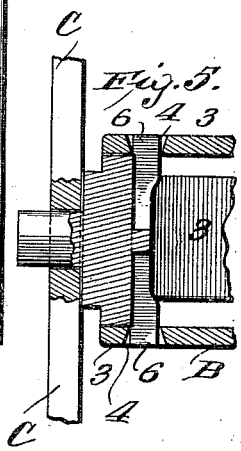
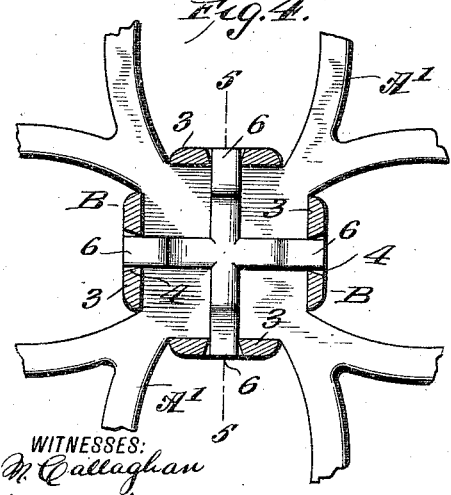
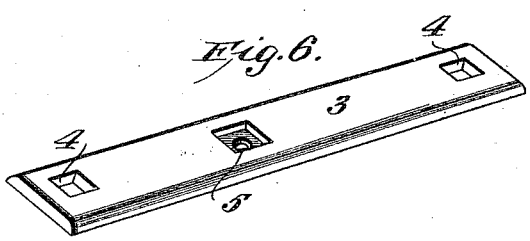
WITNESSES:
INVENTOR
FREDERICK EICHE
ATTORNEYS

UNITED STATES PATENT OFFICE.

FREDERICK EICHE, OF LINCOLN, NEBRASKA.

CLOTHES-LINE REEL.

973,266.  Specification of Letters Patent.  Patented Oct. 18, 1910.

Application filed February 26, 1910. Serial No. 546,055.

*To all whom it may concern:*

Be it known that I, FREDERICK EICHE, a citizen of the United States, and a resident of Lincoln, in the county of Lancaster and State of Nebraska, have invented certain Improvements in Clothes-Line Reels, of which the following is a specification.

My invention is embodied, first, in the construction of a slotted multi-part shaft or axis of the reel and its attachment to the circular sides or flanges of the reel, whereby the said sides are detachably connected and held rigidly in place when in use but may be readily disconnected from the shaft when required to dismember the reel for packing in small space for convenience of storage and transportation.

The details of construction, arrangement, and operation of parts are as hereinafter described and illustrated in the accompanying drawings, in which:—

Figure 1 is a perspective view of my improved reel arranged in position for use. Fig. 2 is a vertical central transverse section of the same. Fig. 3 is a face view of the metal base of the reel proper and the wooden base to which the same is detachably secured. Fig. 4 is an enlarged vertical cross section of the reel shaft and including a portion of one of the reel sides. Fig. 5 is a section on the line 5—5 of Fig. 4. Fig. 6 is a perspective view of one of the bars composing the multi-part shaft or axis of the reel.

The reel proper consists, briefly stated, of two parallel skeleton circular sides A, A', and a shaft or axis B, which rigidly connects them detachably, as will be presently described. The reel is journaled and supported in parallel, skeleton brackets C, C', which are arranged vertically and secured by screw-bolts to the corners of a metal H-shaped frame D—see Figs. 1-3. Said frame D is in turn detachably secured to a wooden base E which is a permanent attachment of a vertical wall.

The details of construction, connection, and operation of parts will now be described.

Each of the reel sides A, A', is provided with a trunnion which projects through the apexes of the brackets C, C', and one of them is squared and provided with a crank 1 by which the reel is rotated for winding a line or rope on the shaft or axis B. One of the circular sides A' has its periphery provided with notches for engagement of a gravity pawl 2, which is pivoted to the adjacent bracket C'. The pawl obviously serves to lock the reel, or prevent backward rotation in winding-on the line.

The shaft or axis B is formed of several—preferably four—flat bars 3—see Figs. 1 and 6. Each of these bars is provided near each end with a square hole 4, and near its center with another hole 5 which is countersunk. The hub of each reel side A, A', is provided with four square lugs 6—see Figs. 4 and 5. The same project radially from the hub, or far enough to permit them to enter the holes 4 in the bars 3. The portions of the hub from which the outer ends of the lugs project are flat and the ends of the bars 3 lie thereon when secured in place, as in Figs. 1, 2, and 4. The bars 3 are connected in pairs by means of screw-bolts 7, as shown in Fig. 2, the same being provided with nuts which, together with the heads of the bolts, are fitted in the countersinks 5 of the several bars. It will be seen that each bolt 7 connects two opposite bars 3 and holds them firmly engaged with the lugs 6 of the reel sides A, A'. Thus, by means of the multi-part shaft or axis constructed as described, the sides A, A', are held rigidly parallel and practically as firmly as if the whole structure were cast integral.

It is apparent that by detaching the bolts 7, the bars 3 may be readily removed from the reel sides A, A', and the latter in turn detached from the brackets C, C', as may be required for convenience and economy of space in storage and transportation.

Each of the base bars 8 of the brackets C, C' is provided with notches, or open slots at 9 to receive the bolts 10 which secure it to the corner flanges of the H-shaped metal base D. This construction obviously provides for convenient and speedy attachment and detachment of the brackets, since it is not necessary to entirely remove the nuts of the bolts 10 for this purpose. The H-shaped base D is detachably secured to the wooden base or wall-plate E by means of brackets or arms 11 and a metal block 12 and button 13 pivoted thereto. The brackets 11 receive the lower cross-bar of the frame D and the latter is provided at its upper end, centrally, with a slot adapted to receive the rectangular block 12. It will be seen that if the button 13 be turned into alinement with the block 12, the frame D may be readily attached to, or detached from, the supporting brackets 11; and that, when in place, as shown in Fig. 3, it is only necessary to turn the button 13 crosswise of the block, as shown in said figure, in order to secure the frame D firmly in place. This attachment or detachment may be obviously made without first detaching the H-shaped frame from the reel brackets. In other words, the whole reel, including the reel proper, the brackets, and the base frame D, may be readily secured to the wall plate E or detached therefrom, as conditions may require. Thus, while the several main parts of the entire apparatus may be detached from each other, for shipment or storage, and while such construction and combination of parts facilitate their manufacture by the casting process, they form, when put together, a rigid but light structure having due rigidity and strength.

What I claim is:—

1. A reel for the purpose specified, comprising parallel side portions and a shaft composed of separable parts whose ends are adapted for detachable engagement with portions of said sides, and means for securing the parts of the shaft together, substantially as described.

2. The improved reel for the purpose specified, comprising parallel side portions provided with hub projections, and a shaft composed of a series of bars whose ends are adapted for engagement with said projections, and means for securing said bars together, substantially as described.

3. The improved reel for the purpose specified, comprising parallel side portions having radial hub projections, a shaft formed of a series of bars having end openings adapted to receive and fit upon said projections, and bolts passing through the plates intermediately of their ends and securing opposite plates detachably together, substantially as described.

FREDERICK EICHE.

Witnesses:
J. A. BROWN,
W. P. SLOCUM.